US010056191B2

(12) United States Patent
Ryu et al.

(10) Patent No.: US 10,056,191 B2
(45) Date of Patent: *Aug. 21, 2018

(54) MULTILAYER CERAMIC CAPACITOR

(71) Applicant: TAIYO YUDEN CO., LTD., Taito-ku, Tokyo (JP)

(72) Inventors: Minoru Ryu, Takasaki (JP); Katsuya Taniguchi, Takasaki (JP); Koichiro Morita, Takasaki (JP); Yoshiki Iwazaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/456,368

(22) Filed: Mar. 10, 2017

(65) Prior Publication Data

US 2017/0365406 A1 Dec. 21, 2017

(30) Foreign Application Priority Data

Jun. 20, 2016 (JP) ................................. 2016-122002

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/1227* (2013.01); *H01G 4/2325* (2013.01)

(58) Field of Classification Search
None
See application file for complete search history.

(56) References Cited

U.S. PATENT DOCUMENTS

| 4,086,649 A | 4/1978 | Hanold |
| 5,910,881 A | 6/1999 | Ueno |

(Continued)

FOREIGN PATENT DOCUMENTS

| JP | H04320017 A | 11/1992 |
| JP | H104027 A | 1/1998 |

(Continued)

OTHER PUBLICATIONS

A Non-Final Rejection issued by U.S. Patent and Trademark Office, dated Sep. 7, 2017, for co-pending U.S. Appl. No. 15/456,962.

*Primary Examiner* — Dion R Ferguson
(74) *Attorney, Agent, or Firm* — Law Office of Katsuhiro Arai (57) ABSTRACT

A multilayer ceramic capacitor includes: a pair of external electrodes; a first internal electrode that is coupled to one of the pair of external electrodes; a dielectric layer that is stacked on the first internal electrode and contains $BaTiO_3$ and Ni; and a second internal electrode that is stacked on the dielectric layer, contains Ni, and is coupled to another one of the pair of external electrodes, wherein Ni concentrations obtained by analyzing five regions with a transmission electron microscope are within a range from 0.015 to 0.045, the five regions being obtained by dividing a region from a location 50 nm away from the first internal electrode of the dielectric layer to a location 50 nm away from the second internal electrode of the dielectric layer in a stacking direction between the first internal electrode and the second internal electrode equally into five.

5 Claims, 5 Drawing Sheets (51) Int. Cl.
*H01G 4/12* (2006.01)
*H01G 4/232* (2006.01)

(56) References Cited

U.S. PATENT DOCUMENTS

| | | |
|---|---|---|
| 6,205,014 B1 | 3/2001 | Inomata et al. |
| 6,205,015 B1 | 3/2001 | Wada et al. |
| 6,380,118 B1 | 4/2002 | Harada et al. |
| 6,930,876 B1 | 8/2005 | Noguchi et al. |
| 7,354,642 B2 | 4/2008 | Shizuno et al. |
| 2003/0062112 A1 | 4/2003 | Matsumoto |
| 2004/0229746 A1 | 11/2004 | Park et al. |
| 2005/0122639 A1 | 6/2005 | Okamatsu et al. |
| 2006/0208575 A1 | 9/2006 | Orimo et al. |
| 2007/0203015 A1 | 8/2007 | Tuan et al. |
| 2007/0223177 A1 | 9/2007 | Ito et al. |
| 2010/0110608 A1 | 5/2010 | Wei et al. |
| 2010/0165541 A1* | 7/2010 | Sasabayashi ....... C04B 35/4682 361/303 |
| 2011/0216472 A1 | 9/2011 | Nakamura et al. |
| 2012/0147524 A1* | 6/2012 | Okamoto ................ H01B 3/12 361/321.4 |
| 2012/0162858 A1 | 6/2012 | Tanaka et al. |
| 2013/0094121 A1 | 4/2013 | Endo et al. |
| 2013/0286541 A1 | 10/2013 | Kawamoto |
| 2014/0307362 A1 | 10/2014 | Kim et al. |
| 2015/0062775 A1 | 3/2015 | Shibasaki et al. |
| 2015/0136462 A1 | 5/2015 | Lee et al. |
| 2015/0340156 A1 | 11/2015 | Masunari et al. |
| 2016/0293333 A1 | 10/2016 | Kaneko et al. |
| 2017/0365405 A1* | 12/2017 | Iwazaki .................. H01G 4/30 |
| 2017/0365407 A1 | 12/2017 | Morita et al. |
| 2017/0365408 A1 | 12/2017 | Morita et al. |
| 2017/0365409 A1 | 12/2017 | Morita et al. |
| 2017/0365410 A1 | 12/2017 | Morita et al. |
| 2017/0365411 A1 | 12/2017 | Taniguchi et al. |
| 2017/0365412 A1 | 12/2017 | Taniguchi et al. |

FOREIGN PATENT DOCUMENTS

| | | |
|---|---|---|
| JP | 2000331867 A | 11/2000 |
| JP | 2003173925 A | 6/2003 |
| JP | 2006319205 A | 11/2006 |
| JP | 2010232248 A | 10/2010 |
| JP | 2012129508 A | 7/2012 |
| JP | 5182531 B2 | 1/2013 |

* cited by examiner

| | WHETHER Ni COMPONENT EXISTS IN ALL FIVE REGIONS | MAXIMUM VALUE OF Ni CONCENTRATION (AMONG MEASURED VALUES OF FIVE POINTS × FIVE REGIONS) | MINIMUM VALUE OF Ni CONCENTRATION (AMONG MEASURED VALUES OF FIVE POINTS × FIVE REGIONS) | NUMBER OF LOCATIONS WHERE Ni CONCENTRATION OF END PORTION 1 IS GREATER (BY 10% OR GREATER) | Ni CONCENTRATION IN ONE OF END PORTIONS 1 OF DIELECTRIC LAYER | Ni CONCENTRATION IN THE OTHER OF END PORTIONS 1 OF DIELECTRIC LAYER | NUMBER OF LAYERS | THICKNESS OF DIELECTRIC LAYER ($\mu m$) | NUMBER OF CRACKS GENERATED (n=100) | DETERMINATION |
|---|---|---|---|---|---|---|---|---|---|---|
| EXAMPLE 1 | YES | 0.0191 | 0.0157 | 5 | +14% | +11% | 150 | 0.50 | 0 | ○ |
| EXAMPLE 2 | YES | 0.0206 | 0.0163 | 4 | +13% | +12% | 200 | 0.50 | 0 | ○ |
| EXAMPLE 3 | YES | 0.0208 | 0.0177 | 5 | +13% | +11% | 300 | 0.50 | 0 | ○ |
| EXAMPLE 4 | YES | 0.0206 | 0.0155 | 5 | +15% | +14% | 150 | 1.50 | 0 | ○ |
| EXAMPLE 5 | YES | 0.0210 | 0.0157 | 5 | +19% | +17% | 200 | 1.50 | 0 | ○ |
| EXAMPLE 6 | YES | 0.0209 | 0.0153 | 5 | +17% | +17% | 300 | 1.50 | 0 | ○ |
| EXAMPLE 7 | YES | 0.0421 | 0.0353 | 4 | +11% | +8% | 200 | 0.50 | 0 | ○ |
| EXAMPLE 8 | YES | 0.0435 | 0.0360 | 0 | +10% | +9% | 200 | 1.50 | 0 | ○ |
| COMPARATIVE EXAMPLE 1 | NO | 0.0110 | 0.0103 | 0 | +4% | +4% | 200 | 0.50 | 1 | × |
| COMPARATIVE EXAMPLE 2 | NO | 0.0108 | 0.0101 | 0 | +2% | +3% | 200 | 1.50 | 2 | × |

MULTILAYER CERAMIC CAPACITOR

CROSS-REFERENCE TO RELATED APPLICATION

This application is based upon and claims the benefit of priority of the prior Japanese Patent Application No. 2016-122002, filed on Jun. 20, 2016, the entire contents of which are incorporated herein by reference.

FIELD

A certain aspect of the present invention relates to a multilayer ceramic capacitor.

BACKGROUND

To achieve small-sized large-capacity multilayer ceramic capacitors, dielectric layers have been thinned and the number of stacked dielectric layers have been increased to develop reliable products. As the dielectric layer becomes thinner, a stress due to the difference in contraction percentage between a dielectric layer and an internal electrode layer may generate a crack in the dielectric layer. The design of dielectric layers that determine the characteristics of the multilayer ceramic capacitor is important.

Disclosed is a technique that diffuses Ni into 3 to 30% of the distance between internal electrodes to improve the temperature characteristic of the capacitance (see Japanese Patent Application Publication No. 10-4027, hereinafter referred to as Patent Document 1, for example). Also disclosed is a technique that reduces insulation deterioration under high temperature and high voltage by arranging a composition region that homogeneously contains Mg or Ni as a dielectric layer so as to make contact with an internal electrode layer and making the central portion of the dielectric layer include a crystal grain in which neither Mg or Ni exists (for example, see Japanese Patent Application Publication No. 2010-232248 hereinafter referred to as Patent Document 2).

However, in the techniques of Patent Documents 1 and 2, Ni is not diffused in the middle portion of the dielectric layer in the stacking direction. In this case, the stress between the dielectric layer and the internal electrode layer is not sufficiently reduced. Therefore, it is difficult to solve the problem that a crack is generated in the dielectric layer.

SUMMARY OF THE INVENTION

According to an aspect of the present invention, there is provided a multilayer ceramic capacitor including: a pair of external electrodes; a first internal electrode that is coupled to one of the pair of external electrodes; a dielectric layer that is stacked on the first internal electrode and contains $BaTiO_3$ and Ni; and a second internal electrode that is stacked on the dielectric layer, contains Ni, and is coupled to another one of the pair of external electrodes, wherein Ni concentrations obtained by analyzing five regions with a transmission electron microscope are within a range from 0.015 to 0.045, the five regions being obtained by dividing a region of the dielectric layer equally into five in a stacking direction, the region of the dielectric layer being located from a location 50 nm away from the first internal electrode to a location 50 nm away from the second internal electrode in the stacking direction between the first internal electrode and the second internal electrode.

DETAILED DESCRIPTION

A description will be given of an embodiment with reference to the accompanying drawings.

Embodiment

Figure 1:
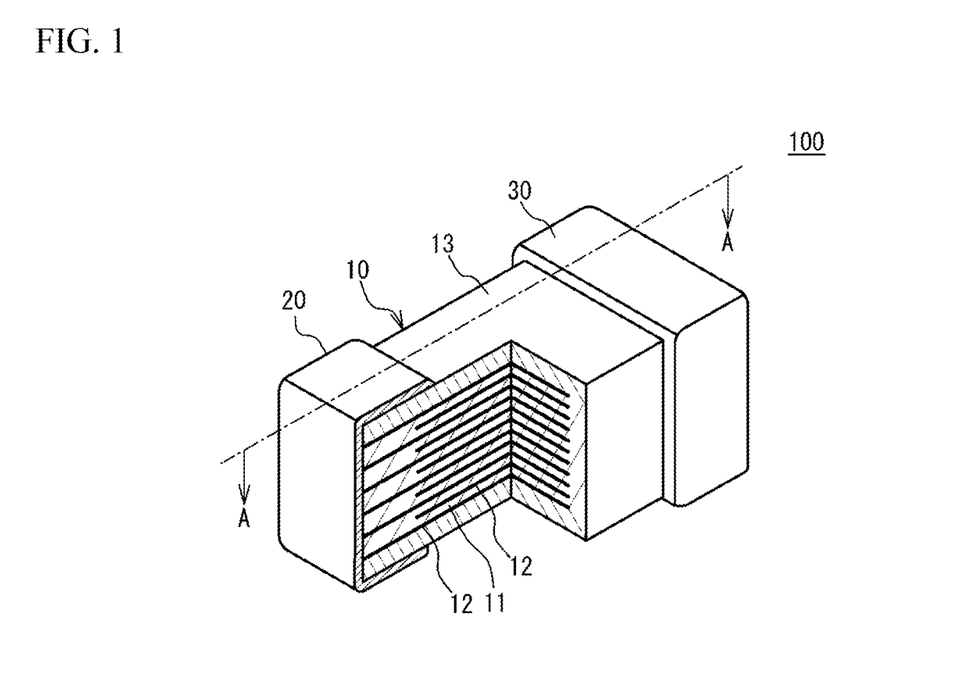
FIG. 1 is a partial cross-sectional perspective view of a multilayer ceramic capacitor.

A multilayer ceramic capacitor will be described. FIG. 1 is a partial cross-sectional perspective view of a multilayer ceramic capacitor 100. As illustrated in FIG. 1, the multilayer ceramic capacitor 100 includes a multilayer chip 10 having a rectangular parallelepiped shape, and external electrodes 20 and 30 that are located on opposing end faces of the multilayer chip 10.

The external electrodes 20 and 30 contain a base metal material. The multilayer chip 10 has a structure designed to have dielectric layers 11, which contain a ceramic material functioning as a dielectric, and internal electrode layers 12, which contain a base metal material, alternately stacked. The end edges of the internal electrode layers 12 are alternately exposed to the end face, on which the external electrode 20 is located, of the multilayer chip 10, and to the end face, on which the external electrode 30 is located, of the multilayer chip 10. Accordingly, the internal electrode layers 12 are alternately electrically coupled to the external electrode 20 and to the external electrode 30. This structure allows the multilayer ceramic capacitor 100 to have a structure in which a plurality of the dielectric layers 11 are stacked across the internal electrode layers 12. Additionally, in the multilayer chip 10, both end faces in the direction in which the dielectric layers 11 and the internal electrode layers 12 are stacked (hereinafter, referred to as the stacking direction) are covered with cover layers 13. The material of the cover layer 13 is, for example, the same as the material of the dielectric layer 11.

The multilayer ceramic capacitor 100 has, for example, a length of 0.2 mm, a width of 0.1 mm, and a height of 0.3 mm, or a length of 0.6 mm, a width of 0.3 mm, and a height of 0.3 mm, or a length of 1.0 mm, a width of 0.5 mm, and a height of 0.5 mm, or a length of 3.2 mm, a width of 1.6 mm, and a height of 1.6 mm, or a length of 4.5 mm, a width of 3.2 mm, and a height of 2.5 mm, but the dimensions are not limited to the above dimensions.

The external electrodes 20 and 30 and the internal electrode layer 12 are mainly composed of nickel (Ni). The dielectric layer 11 is mainly composed of $BaTiO_3$ having a perovskite structure and contains Ni. The perovskite structure includes $ABO_{3-\alpha}$ having an off-stoichiometric composition. Ni contained in the internal electrode layer 12 is diffused into the dielectric layer 11 in the form of an oxidized material. Accordingly, Ni is distributed in the dielectric layer 11. When the dielectric layer 11 has a region that does not partially contain Ni in the stacking direction, the contraction percentage difference due to the thermal fluctuation between the dielectric layer 11 and the internal electrode layer 12 cannot be reduced. As a result, a crack is easily generated in the dielectric layer 11. Thus, in the following embodiment, a description will be given of a multilayer ceramic capacitor that can make a stress based on the contraction percentage difference due to the thermal fluctuation between the dielectric layer 11 and the internal electrode layer 12 small, and thereby can inhibit crack generation in the dielectric layer 11.

Figure 2:
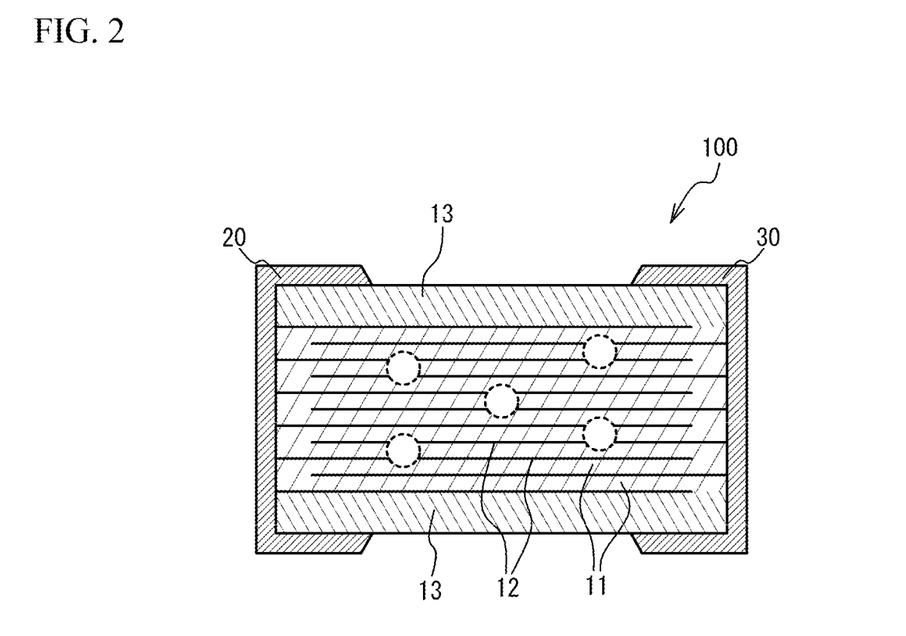
FIG. 2 is a cross-sectional view taken along line A-A in FIG. 1.

FIG. 2 is a cross-sectional view taken along line A-A in FIG. 1. The dielectric layer 11 sandwiched between two internal electrode layers 12, one of which is coupled to the external electrode 20 and the other of which is coupled to the external electrode 30, contains Ni across the entire region in the stacking direction. In this case, the contraction percentage of the dielectric layer 11 can be brought close to the contraction percentage of the internal electrode layer 12. Therefore, the thermal stress between the dielectric layer 11 and the internal electrode layer 12 can be reduced. Too low Ni concentration in the dielectric layer 11 prevents the contraction percentage of the dielectric layer 11 from being brought sufficiently close to the contraction percentage of the internal electrode layer 12. In this case, a crack is easily generated in the dielectric layer 11. Thus, the present embodiment sets a lower limit of the Ni concentration of the dielectric layer 11. On the other hand, too high Ni concentration in the dielectric layer 11 deteriorates the dielectric characteristic of the dielectric layer 11. In this case, a leak may occur between two adjacent internal electrode layers 12. Thus, the present embodiment sets an upper limit of the Ni concentration of the dielectric layer 11. In the present embodiment, the Ni concentration is an atomic concentration ratio Ni/(Ba+Ti).

Figure 3:
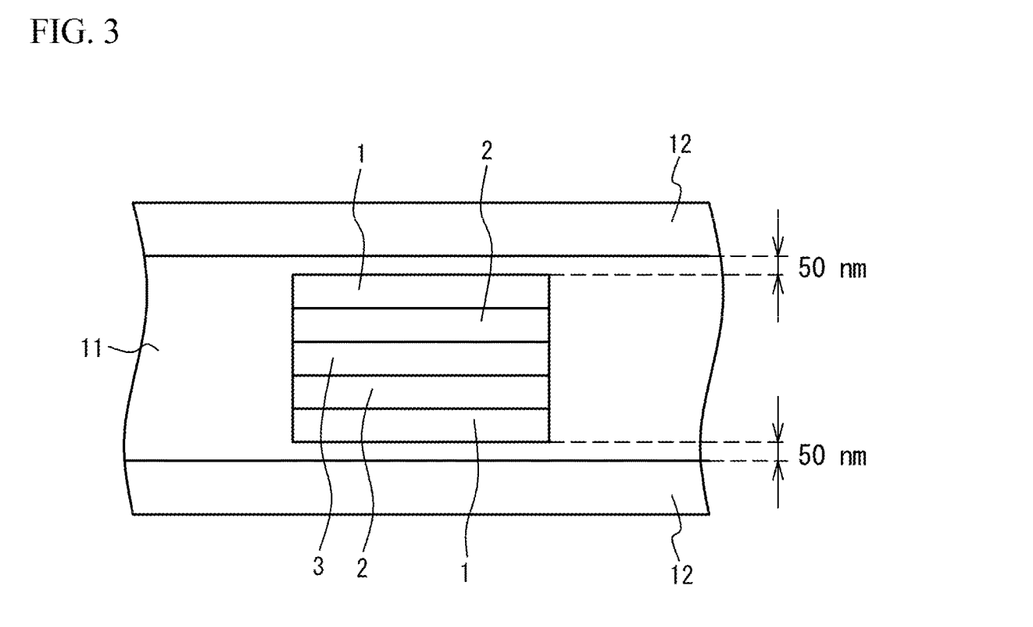
FIG. 3 is a partial enlarged view of FIG. 2.

FIG. 3 is a partial enlarged view of the cross-section of the multilayer ceramic capacitor 100, schematically enlarging any of areas indicated by circles in FIG. 2. Hatching is omitted. As illustrated in FIG. 3, in the stacking direction between opposing surfaces of two adjacent internal electrode layers 12, a region from a location 50 nm away from one of the internal electrode layers 12 to a location 50 nm away from the other of the internal electrode layers 12 is virtually divided into five equal regions. Two measurement regions closest to the internal electrode layers 12 are referred to as end portions 1, and the central measurement region is referred to as a central portion 3, and measurement regions between the end portions 1 and the central portion 3 are referred to as end portions 2.

In the present embodiment, in each of the five measurement regions obtained by division into five equal regions, a ratio (Ni_Kα)/(Ba_Lα+Ti_Kα) of an STEM-EDS spectrum obtained by the analysis with a transmission electron microscope is obtained as the Ni concentration, and the Ni concentration in the dielectric layer 11 is adjusted so that the ratio is within a range from 0.015 to 0.045. Setting the lower limit of the Ni concentration allows the contraction percentage of the dielectric layer 11 to be brought sufficiently close to the contraction percentage of the internal electrode layer 12. In addition, setting the upper limit of the Ni concentration allows the dielectric characteristic of the dielectric layer 11 to be maintained. Therefore, the thermal stress due to the contraction percentage difference between the dielectric layer 11 and the internal electrode layer 12 can be reduced, and thereby crack generation in the dielectric layer 11 can be inhibited while the dielectric characteristic of the dielectric layer 11 is maintained.

The reason for using the region located 50 nm away from the internal electrode layers 12 is because the reflection by Ni of the internal electrode layer 12 may prevent the accurate measurement. In addition, the width of the measurement region is made to be 1 to 1.5 times the thickness of the dielectric layer 11 in the stacking direction. The both end faces in the stacking direction of the dielectric layer 11 of each measurement region are located in a region where the two adjacent internal electrode layers 12 overlap with each other in a plan view over the entire region. The two adjacent internal electrode layers here mean the electrodes producing a capacitance. That is, the two adjacent internal electrode layers are internal electrode layers one of which is coupled to the external electrode 20 and the other of which is coupled to the external electrode 30.

A description will next be given of a measurement method of the Ni concentration. The Ni concentration can be calculated by measuring the distribution of Ni atoms in the stacking direction of the dielectric layer 11. The distribution of Ni atoms can be measured with a transmission electron microscope or the like. For example, a TEM-EDS (TEM JEM-2100F manufactured by JEOL Ltd.), an EDS detector (JED-2300T manufactured by JEOL Ltd.) or the like can be used. Samples for the measurement can be made by mechanically polishing (polishing in a plane normal to the internal electrode layer) a reoxidized multilayer ceramic capacitor, and thinning the resulting multilayer ceramic capacitor by ion milling. For example, five samples with a thickness of 0.05 μm for five measurement regions may be made. If a sample that allows five measurement regions to be measured with the sample alone is made, the measurement that can reduce variations can be performed.

For example, a transmission electron microscope with a probe diameter of 1.5 nm scans and measures each measurement region over the entire range to measure the Ni concentration in each measurement region. Here, the integrated value of signal intensities between 7.4 keV and 7.6 keV of an STEM-EDS spectrum is specified to be the intensity of Ni_Kα, and the intensity between 4.4 keV and 4.6 keV is specified to be the intensity of (Ba_Lα+Ti_Kα).

The tip portion of the internal electrode layer 12 and an anomalous point at which deposits aggregate in the dielectric layer 11 are excluded from the Ni concentration measurement. For example, an area containing a composition different from that of the parent phase and having a diameter of 50 nm or greater is excluded from the measurement regions. Such an area is, for example, an area in which compounds containing Si, compounds containing Mn, or compounds containing Ni—Mg aggregate to exist. Alternatively, such an area is an area where the abundance ratio of Ba and Ti is 90% or less.

For example, the count numbers of (Ni_Kα), (Ba_Lα), and (Ti_Kα) are obtained from an STEM-EDS spectrum, and are normalized by dividing them by respective sensitivity factors (respective k factors) used in the Cliff-Lorimer method. When the count number of (Ni_Kα)=I(Ni), the count number of (Ba_Lα)=I(Ba), and the count number of (Ti_Kα)=I(Ti), the Ni concentration={I(Ni)/k(Ni)}/{I(Ba)/k(Ba)+I(Ti)/k(Ti)}. Where k(Ni), k(Ba), and k(Ti) are sensitivity factors for normalization.

Then, based on the normalized values, the Ni concentration is calculated by the normalized value of (Ni_Kα)/{the normalized value of (Ba_Lα)+the normalized value of (Ti_Kα)}. In each region, the measurement is performed till the intensity of (Ba_Lα)±(Ti_Kα) exceeds 500,000 counts. The JED Series Analysis Program manufactured by JEOL Ltd. can be used to calculate the Ni concentration from the STEM-EDS spectrum.

In the present embodiment, when the Ni concentration obtained by analysis with a transmission electron microscope is within a range from 0.015 to 0.045 in each of the above five measurement regions in 80% or more of a plurality of the dielectric layers 11 stacked in the multilayer ceramic capacitor 100, the Ni concentration obtained by analysis with a transmission electron microscope is defined to be within a range from 0.015 to 0.045 in each of the above five measurement regions in the overall dielectric layer 11 in the stacking direction of the multilayer ceramic capacitor 100. For example, as indicated by circles in FIG. 2, the Ni concentration obtained by analysis with a transmission electron microscope is within a range from 0.015 to 0.045 in each of the above five measurement regions in at least four dielectric layers 11 of five dielectric layers 11 located in different locations in the stacking direction, it can be judged that the Ni concentration obtained by analysis with a transmission electron microscope is within a range from 0.015 to 0.045 in each of the above five measurement regions in 80% or more of a plurality of the dielectric layers 11 stacked in the multilayer ceramic capacitor 100. When the Ni concentration obtained by analysis with a transmission electron microscope is within a range from 0.015 to 0.045 in each of the above five measurement regions in a plurality of the dielectric layers 11 located in different locations in the stacking direction in the multilayer ceramic capacitor 100, crack generation in the dielectric layer 11 can be inhibited while the dielectric characteristic of the dielectric layer 11 is maintained across the multilayer ceramic capacitor 100.

It is preferable that when the Ni concentration obtained by analysis with a transmission electron microscope is within a range from 0.015 to 0.045 in each of the above five measurement regions in 90% or more of a plurality of the dielectric layers 11 stacked in the multilayer ceramic capacitor 100, the Ni concentration obtained by analysis with a transmission electron microscope is defined to be within a range from 0.015 to 0.045 in each of the above five measurement regions in the overall dielectric layer 11 in the stacking direction of the multilayer ceramic capacitor 100. For example, as indicated by circles in FIG. 2, the Ni concentration obtained by analysis with a transmission electron microscope is within a range from 0.015 to 0.045 in each of the above five measurement regions in all of five dielectric layers 11 located in different locations in the stacking direction, it can be judged that the Ni concentration obtained by analysis with a transmission electron microscope is within a range from 0.015 to 0.045 in each of the above five measurement regions in 90% or more of a plurality of the dielectric layers 11 stacked in the multilayer ceramic capacitor 100.

In addition, to inhibit crack generation in the dielectric layer 11, the Ni concentration obtained by analysis with a transmission electron microscope is preferably within a range from 0.020 to 0.040, more preferably a range from 0.025 to 0.035 in each of the above five measurement regions.

In addition, when the Ni concentration in the end portion 1, which is located closer to the internal electrode layer 12 than the central portion 3, is brought closer to the Ni concentration of the internal electrode layer 12 than the Ni concentration in the central portion 3, the thermal stress between the dielectric layer 11 and the internal electrode layer 12 can be further reduced. Thus, the end portion 1 preferably has a Ni concentration greater than that of the central portion 3. For example, the Ni concentration in the end portion 1 is preferably greater than the Ni concentration in the central portion 3 by 10% or more. Here, the term "greater by 10% or more" means that when the Ni concentration in the central portion 3 is 100, the Ni concentration in the end portion 1 is 110 or greater. The Ni concentration in the end portion 1 is preferably greater than the Ni concentration in the central portion 3 by 15% or more. Here, the term "greater by 15% or more" means that when the Ni concentration in the central portion 3 is 100, the Ni concentration in the end portion 1 is 115 or greater.

In the present embodiment, when the Ni concentration in at least one of the end portions 1 is greater than the Ni concentration in the central portion 3 by 10% or more in 80% or more of a plurality of the dielectric layers 11 stacked in the multilayer ceramic capacitor 100, the Ni concentration in at least one of the end portions 1 is defined to be greater than the Ni concentration in the central portion 3 by 10% or more in the overall dielectric layer 11 in the stacking direction of the multilayer ceramic capacitor 100. For example, as indicated by circles in FIG. 2, when the Ni concentration in at least one of the end portions 1 is greater than the Ni concentration in the central portion 3 by 10% or more in at least four of five dielectric layers 11 located in different locations in the stacking direction, it can be judged that the Ni concentration in at least one of the end portions 1 is greater than the Ni concentration in the central portion 3 by 10% or more in 80% or more of a plurality of the dielectric layers 11 stacked in the multilayer ceramic capacitor 100. When the Ni concentration in the end portion 1 is greater than the Ni concentration in the central portion 3 by 10% or more in the overall dielectric layer 11 in the stacking direction of the multilayer ceramic capacitor 100, crack generation in the dielectric layer 11 can be inhibited while the dielectric characteristic of the dielectric layer 11 is maintained across the multilayer ceramic capacitor 100.

It is preferable that when the Ni concentration in at least one of the end portions 1 is greater than the Ni concentration in the central portion 3 by 10% or more in 90% or more of a plurality of the dielectric layers 11 stacked in the multilayer ceramic capacitor 100, the Ni concentration in at least one of the end portions 1 is defined to be greater than the Ni concentration in the central portion 3 by 10% or more in the overall dielectric layer 11 in the stacking direction of the multilayer ceramic capacitor 100. For example, as indicated by circles in FIG. 2, when the Ni concentration in at least one of the end portions 1 is greater than the Ni concentration in the central portion 3 by 10% or more in all of five dielectric layers 11 located in different locations in the stacking direction, it can be judged that the Ni concentration in at least one of the end portions 1 is greater than the Ni concentration in the central portion 3 by 10% or more in 90% or more of a plurality of the dielectric layers 11 stacked in the multilayer ceramic capacitor 100.

In addition, when the Ni concentration in at least one of the end portions 1 is greater than the Ni concentration in the central portion 3 by 15% or more in 80% or more of a plurality of the dielectric layers 11 stacked in the multilayer ceramic capacitor 100, the Ni concentration in at least one of the end portions 1 is defined to be greater than the Ni concentration in the central portion 3 by 15% or more in the overall dielectric layer 11 in the stacking direction of the multilayer ceramic capacitor 100. For example, as indicated by circles in FIG. 2, when the Ni concentration in at least one of the end portions 1 is greater than the Ni concentration in the central portion 3 by 15% or more in at least four of five dielectric layers 11 located in different locations in the stacking direction, it can be judged that the Ni concentration in at least one of the end portions 1 is greater than the Ni concentration in the central portion 3 by 15% or more in 80% or more of a plurality of the dielectric layers 11 stacked in the multilayer ceramic capacitor 100. When the Ni concentration in the end portion 1 is greater than the Ni concentration in the central portion 3 by 15% or more in the overall dielectric layer 11 in the stacking direction of the multilayer ceramic capacitor 100, crack generation in the dielectric layer 11 can be further inhibited while the dielectric characteristic of the dielectric layer 11 is maintained across the multilayer ceramic capacitor 100.

It is preferable that when the Ni concentration in at least one of the end portions 1 is greater than the Ni concentration in the central portion 3 by 15% or more in 90% or more of a plurality of the dielectric layers 11 stacked in the multilayer ceramic capacitor 100, the Ni concentration in at least one of the end portions 1 is defined to be greater than the Ni concentration in the central portion 3 by 15% or more in the overall dielectric layer 11 in the stacking direction of the multilayer ceramic capacitor 100. For example, as indicated by circles in FIG. 2, when the Ni concentration in at least one of the end portions 1 is greater than the Ni concentration in the central portion 3 by 15% or more in all of five dielectric layers 11 located in different locations in the stacking direction, it can be judged that the Ni concentration in at least one of the end portions 1 is greater than the Ni concentration in the central portion 3 by 15% or more in 90% or more of a plurality of the dielectric layers 11 stacked in the multilayer ceramic capacitor 100.

Figure 4:
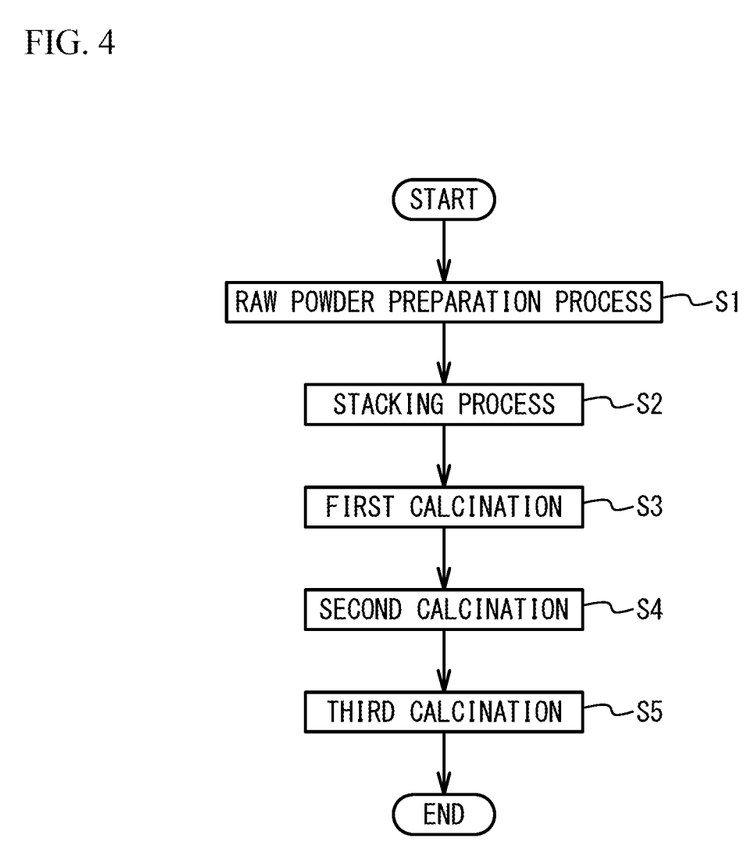
FIG. 4 is a flowchart illustrating a method of manufacturing the multilayer ceramic capacitor.

A description will next be given of a manufacturing method of the multilayer ceramic capacitor 100. FIG. 4 is a flowchart illustrating a method of manufacturing the multilayer ceramic capacitor 100.

Raw Powder Preparation Process

First, as illustrated in FIG. 4, raw powder for forming the dielectric layer 11 is prepared. Ba and Ti contained in the dielectric layer 11 are normally contained in the dielectric layer 11 in the form of a sintered compact of particles of $BaTiO_3$. $BaTiO_3$ is a tetragonal compound having a perovskite structure, exhibiting a high permittivity. $BaTiO_3$ is normally obtained by reacting a titanium raw material such as titanium dioxide with a barium raw material such as barium carbonate to synthesize barium titanate. There have been known many kinds of methods such as, for example, the solid phase method, the sol-gel method, and the hydrothermal method as a method of synthesizing $BaTiO_3$. The present embodiment can employ any of these methods.

Specified additive compounds may be added to the resulting ceramic powder according to the purpose. The examples of the additive compounds include Mg, Mn, V, Cr, oxidation materials of rare-earth elements (Y, Dy, Tm, Ho, Tb, Yb, and Er), and oxidation materials of Sm, Eu, Gd, Co, Li, B, Na, K, and Si, or glass.

In the present embodiment, preferably, a compound containing an additive compound is mixed with particles of $BaTiO_3$, and the resulting mixture is calcined at 820 to 1150° C. Then, the resulting particles of $BaTiO_3$ are wet blended with the additive compound, dried, and ground to prepare ceramic powder. For example, the particles of $BaTiO_3$ obtained by the above described method and used to manufacture the multilayer ceramic capacitor 100 of the present embodiment preferably have an average particle size of 50 to 150 nm to make the dielectric layer 11 thinner. For example, the particle size of the ceramic powder obtained as described above may be adjusted by a grinding treatment as necessary, or may be controlled in combination with a classification treatment.

Stacking Process

Next, a binder such as polyvinyl butyral (PVB) resin, an organic solvent such as ethanol or toluene, and a plasticizer such as dioctyl phthalate (DOP) are added to the resulting ceramic powder and wet-blended. With use of the resulting slurry, a strip-shaped dielectric green sheet with a thickness of 0.8 μm or less is coated on a base material by, for example, a die coater method or a doctor blade method, and then dried.

Then, a conductive metal paste containing an organic binder is printed on the surface of the dielectric green sheet by screen printing or gravure printing to arrange a pattern of internal electrode layers alternately led out to a pair of external electrodes of different polarizations. For the metal of the conductive metal paste, used is Ni with a purity of 99% or greater. $BaTiO_3$ with an average particle size of 50 nm or less may be homogeneously distributed as a co-material into the conductive metal paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers are alternately exposed to both end faces in the length direction of the dielectric layer so as to be alternately led out to a pair of external electrodes of different polarizations. Cover sheets, which are to be the cover layers 13, are pressed to be bonded at the top and bottom of the stacked dielectric green sheets, and cut into a predetermined chip size (for example, 1.0×0.5 mm). This process allows the molded body of the multilayer chip 10 to be obtained.

First Calcination Process

The molded body of the multilayer chip 10 obtained as described above is debindered in an $N_2$ atmosphere, at 250 to 500° C., and is then calcined in a reducing atmosphere (with an oxygen partial pressure of $10^{-5}$ to $10^{-7}$ Pa), at 1100 to 1300° C. for ten minutes to two hours. This process causes the compounds constituting the dielectric green sheets to be sintered, growing grains of the compounds. In this manner, obtained is the multilayer ceramic capacitor 100 including the multilayer chip 10 formed of the dielectric layers 11 and the internal electrode layer 12 that are made of a sintered compact and alternately stacked thereinside, and the cover layers 13 formed as the outermost layers at the top and the bottom in the stacking direction.

Second Calcination Process

Then, second calcination is performed as a heat treatment for diffusing Ni in the internal electrode layer 12 into the dielectric layer 11. The multilayer ceramic capacitor 100 is heat treated at 1150 to 1350° C., which is greater than the temperature of the first calcination by approximately 50° C., at an oxygen partial pressure of $10^{-3}$ to $10^{-6}$ Pa for 0.25 to 0.5 hour. The calcination at an oxygen partial pressure higher than that of the first calcination facilitates oxidation of Ni, and diffuses Ni into the dielectric layer 11. On the other hand, the ratio $(Ni\_K\alpha)/(Ba\_L\alpha+Ti\_K\alpha)$ of an STEM-EDS spectrum obtained by analysis with a transmission electron microscope, i.e., the Ni concentration, can be controlled to be within a range from 0.015 to 0.045 in each of the above five measurement regions of the dielectric layer 11 by setting the second calcination time to 0.25 to 0.5 hour.

Third Calcination Process

Then, as reoxidation calcination, performed is third calcination (a reoxidation treatment) at 600 to 1000° C., at an oxygen partial pressure of $10^{-2}$ to 10 Pa for about one hour. In the third calcination process, since the oxygen partial pressure is high, Ni is easily oxidized, but the Ni concentration in the dielectric layer 11 does not change because the calcination temperature range is lower than that of the second calcination process.

The temperature and time of the calcination reaction are preferably appropriately adjusted depending on the component size and the number of stacked layers. The diffusion of Ni proceeds a little in the first calcination, but is more likely to proceed in the second calcination of which the oxygen partial pressure is greater than that of the first calcination. As the condition of the second calcination, when the calcination time is shortened, Ni diffuses only into the end portions, which are in contact with the internal electrode layers 12, of the dielectric layer 11. When the calcination time is too short, Ni does not diffuse into the dielectric layer 11, while when the calcination temperature is too high or the calcination time is too long, the diffusion of Ni also proceeds to the central portion 3 of the dielectric layer 11, and the Ni concentration in the end portion 1 cannot be made to be high. Too much procession of the diffusion of Ni causes the Ni concentration in the dielectric layer 11 to be excess, and may cause a leak between electrodes. The condition of the second calcination is set so that the Ni concentration in the end portion 1 is greater than that of the central portion 3 of the dielectric layer 11 by adjusting the temperature and time of the second calcination.

The external electrodes 20 and 30 may be formed by, for example, calcining the multilayer chip 10 formed by stacking the dielectric layers 11 and the internal electrode layers 12, and then baking a conductive paste on both end portions of the multilayer chip 10. Alternatively, the conductive paste may be applied before the second calcination, and baked simultaneously at the time of the second calcination. The external electrodes may be thickly formed on both end faces of the multilayered body by sputtering.

In addition to the above-described manufacturing method, Ni can be formed in the dielectric layer 11 by adding NiO to slurry when the slurry is formed. Alternatively, a method that diffuses Ni into the dielectric layer from the internal electrode by adding NiO to slurry and then performing the above-described second calcination process may be employed.

EXAMPLES

The multilayer ceramic capacitors in accordance with the embodiment were made to examine the characteristics.

Examples 1 to 8

The multilayer ceramic capacitors 100 were made in accordance with the manufacturing method in accordance with the above-described embodiment. Table 1 lists the structure common to examples 1 to 8. The external electrodes 20 and 30 are formed on both end portions of the multilayer chip 10, and have a structure including a Cu portion (with a thickness of 22 μm), a Ni portion (with a thickness of 2 μm) formed on the Cu portion by plating, and an Sn portion (with a thickness of 6 μm) formed on the Ni portion by plating. The central portion of the multilayer ceramic capacitor 100 was cut by ion milling so that the cross-section illustrated in FIG. 2 was exposed, and the resulting cross-section was photographed by a scanning electron microscope (SEM). Then the thicknesses of the dielectric layer 11 and the internal electrode layer 12, i.e., the dimensions in the stacking direction, were measured based on the resulting photo. An SEM photo was taken so that the view angle of the SEM photo was 10 to 30 μm in both length and width, and the thicknesses of the dielectric layer 11 and the internal electrode layer 12 were measured at several locations located every 3 μm. Then, the averages of the measured thicknesses were calculated as the thicknesses of the dielectric layer 11 and the internal electrode layer 12. Twenty locations were measured in five different fields of view to obtain 100 sets of data, and the averages of them were specified to be the thicknesses of the dielectric layer 11 and the internal electrode layer 12. The thickness of the dielectric layer 11 and the number of layers are presented in FIG. 5.

TABLE 1

| | |
|---|---|
| Dimensions (mm) Length × Width × Height | 1.0 × 0.5 × 0.5 |
| Thickness of the internal electrode | 0.8 μm |
| Thickness of the external electrode (including plating) | 30 μm |
| Relative permittivity | 2000 to 4800 |

In the examples 1 to 8, in the first calcination process, the molded body of the multilayer chip 10 was debindered in an $N_2$ atmosphere, at 250 to 500° C., and then calcined in a reducing atmosphere with an oxygen partial pressure of $5.0 \times 10^{-6}$ Pa, at 1200° C. for one hour to cause the compounds constituting the dielectric green sheets to be sintered to grow grains of the compounds. Then, in the examples 1 to 6, in the second calcination process, the multilayer ceramic capacitor 100 was calcined in a reducing atmosphere with an oxygen partial pressure of $5.0 \times 10^{-4}$ Pa, at 1250° C., which is 50° C. greater than the temperature of the first calcination process, for 20 minutes to diffuse Ni in the internal electrode 12 into the dielectric layer 11. Then, the third calcination process was performed. In the examples 7 and 8, in the second calcination process, the multilayer ceramic capacitor 100 was calcined in a reducing atmosphere with an oxygen partial pressure of $5.0 \times 10^{-4}$ Pa, at 1250° C., which is 50° C. greater than the temperature of the first calcination process, for 30 minutes to diffuse Ni in the internal electrode 12 into the dielectric layer 11. Then, the third calcination process was performed.

In comparative examples 1 and 2, in the first calcination process, the molded body of the multilayer chip 10 was debindered in an $N_2$ atmosphere, at 250 to 500° C., and then calcined in a reducing atmosphere with an oxygen partial pressure of $5.0 \times 10^{-6}$ Pa, at 1200° C. for one hour to cause the compounds constituting the dielectric green sheet to be sintered to grow grains of the compounds. Then, in the second calcination process, the multilayer ceramic capacitor 100 was calcined in a reducing atmosphere with an oxygen partial pressure of $5.0 \times 10^{-4}$ Pa, at 1250° C., which is 50° C. greater than the temperature of the first calcination process, for 5 minutes to diffuse Ni in the internal electrode 12 into the dielectric layer 11. Then, the third calcination process was performed.

One hundred samples were made for each of the examples 1 to 8 and the comparative examples 1 and 2.

For the examples 1 to 8 and the comparative examples 1 and 2, the Ni concentration of the dielectric layer 11 was measured. As described above, in the five dielectric layers 11 located in different locations in the stacking direction as indicated by circles in FIG. 2, a region from a location 50 nm away from one internal electrode layer 12 and to a location 50 nm away from the other internal electrode layer 12 in the stacking direction was virtually divided into five equal regions. The width in the direction perpendicular to the stacking direction was made to be 1.2 times the thickness of the dielectric layer 11, and the Ni concentrations in the obtained five measurement regions were measured. The two adjacent internal electrode layers 12 overlap each other in a plan view as effective electrodes across the entire surfaces of both end faces in the stacking direction of each measurement region.

For the measurement of the Ni concentration, a TEM-EDS (TEM JEM-2100F manufactured by JEOL Ltd.) and an EDS detector (JED-2300T manufactured by JEOL Ltd.) were used. Samples for measurement were made by mechanically polishing (polishing in a plane normal to the internal electrode layer) a reoxidized multilayer ceramic capacitor and thinning the polished multilayer ceramic capacitor by ion milling. Samples with a thickness of 0.05 μm were made so that five measurement regions could be measured. Each measurement region was scanned and measured with a probe diameter of 1.5 nm, and the Ni concentration in each measurement region was measured. To measure the Ni concentration, the Ni concentration was calculated from the STEM-EDS spectrum using the JED Series Analysis Program manufactured by JEOL Ltd. as described above.

Analysis

Figure 5:
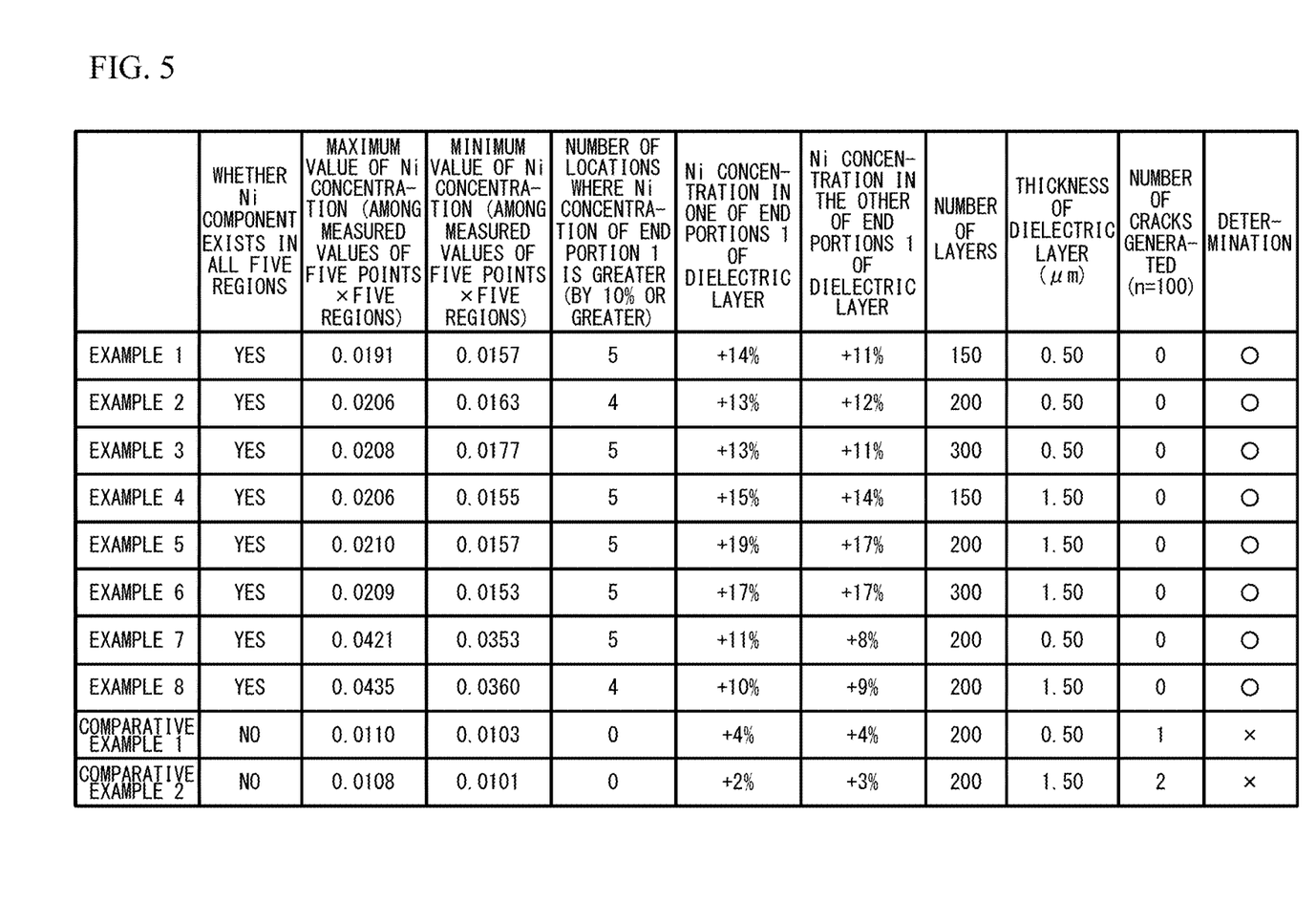
FIG. 5 illustrates examples and comparative examples.

FIG. 5 presents the results of the Ni concentration measurement. In FIG. 5, the column "maximum value of Ni concentration" presents the highest of the ratios (Ni_Kα)/(Ba_Lα+Ti_Kα) (normalized values) of the STEM-EDS spectra in five measurement regions of five dielectric layers 11 located in different locations in the stacking direction. The column "minimum value of Ni concentration" presents the lowest of the ratios (Ni_Kα)/(Ba_Lα+Ti_Kα) (normalized values) of the STEM-EDS spectra in the five measurement regions of the five dielectric layers 11 located in different locations in the stacking direction. In FIG. 5, for the column "whether Ni component exists in all five regions", when the Ni concentration is 0.015 or greater in all the five measurement regions of the five dielectric layers 11 located in different locations in the stacking direction, "YES" is recorded. When the Ni concentration is less than 0.015 in at least one of the measurement regions, "NO" is recorded.

In FIG. 5, the column "number of locations where Ni concentration in end portion 1 is greater (by 10% or more)" presents the number of locations where it was determined that the Ni concentration in at least one of the end portions 1 was greater than the Ni concentration in the central portion 3 by 10% or more in the measured five dielectric layers 11 located in different locations. The value recorded in the column "Ni concentration in one of end portions 1 of dielectric layer" is the lowest value of the Ni concentrations of the end portions 1 relative to those of the corresponding central portions 3 in the measured five dielectric layers 11 located in different locations. In addition, the value recorded in the column "Ni concentration in the other of end portions 1 of dielectric layer" presents the Ni concentration in the other end portion 1 corresponding to the Ni concentration in one end portion 1. The Ni concentration in the end portion 1 greater by 10% or more is presented for the Ni concentration in the other end portion 1 in the examples 2 and 8.

For the example 1 to 6, it is considered that the Ni concentration in the end portion 1 with respect to that of the central portion 3 was high because the second calcination time was 20 minutes and the Ni was thereby diffused from the internal electrode layer 12 into the end portion 1 of the dielectric layer 11. For the examples 7 and 8, it is considered that the Ni concentration in the end portion 1 with respect to that of the central portion 3 decreased because the second calcination time was 30 minutes and Ni was also diffused from the internal electrode layer 12 into the central portion 3 of the dielectric layer 11. For the comparative examples 1 and 2, it is considered that Ni hardly diffused from the internal electrode layer 12 to the end portion 1 of the dielectric layer 11 because the second calcination time was 5 minutes, but it is also considered that the Ni concentrations of the end portion 1 and the central portion 3 in the dielectric layer 11 were homogenized in some way.

FIG. 5 also presents whether a crack was generated. For each of the examples 1 to 8 and the comparative examples 1 and 2, a heat cycle load was applied to 100 samples. The heat cycle load of 1000 cycles, each of which applies normal temperature, −55° C. for 5 min, normal temperature, 150° C. for 5 min, and normal temperature in this order, was applied to the samples, and then whether a crack was generated in a product was evaluated with a 40 to 800-power microscope. Circles represents that no crack was generated, and cross marks represents that a crack was generated in one or more products.

In the comparative example 2, the number of cracks generated is two. In the comparative example 1, the number of cracks generated is one. In any of the examples 1 to 8, the number of cracks generated is zero. It is considered that crack generation was inhibited because (Ni_Kα)/(Ba_Lα+Ti_Kα) of the STEM-EDS spectrum, i.e., the Ni concentration, was 0.015 or greater in each of the five measurement regions in at least four of five different dielectric layers 11 in the examples 1 to 8. It is considered that crack generation was not inhibited because (Ni_Kα)/(Ba_Lα+Ti_Kα) of the STEM-EDS spectrum, i.e., the Ni concentration, did not become 0.015 or greater in each of the five measurement regions in at least four of five different dielectric layers 11 in the comparative examples 1 and 2. When the Ni concentration exceeds 0.045, since all Ni may not be oxidized in the third calcination process and metal Ni may remain in the dielectric layer 11, a leak between electrodes may occur.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
    a pair of external electrodes;
    a first internal electrode that is coupled to one of the pair of external electrodes;
    a dielectric layer that is stacked on the first internal electrode and contains $BaTiO_3$ and Ni; and
    a second internal electrode that is stacked on the dielectric layer, contains Ni, and is coupled to another one of the pair of external electrodes, wherein
    Ni concentrations obtained by analyzing five regions with a transmission electron microscope are within a range from 0.015 to 0.045, the five regions being obtained by dividing a region of the dielectric layer equally into five in a stacking direction, the region of the dielectric layer being located from a location 50 nm away from the first internal electrode to a location 50 nm away from the second internal electrode in the stacking direction between the first internal electrode and the second internal electrode, and
    the Ni concentrations are atomic concentration ratios Ni/(Ba+Ti).

2. The multilayer ceramic capacitor according to claim 1, a Ni concentration in at least one of end regions located closest to the first internal electrode and the second internal electrode among the five regions is greater than a Ni concentration in a central region of the five regions by 10% or more.

3. The multilayer ceramic capacitor according to claim 1, wherein
a Ni concentration in at least one of end regions located closest to the first internal electrode and the second internal electrode among the five regions is greater than a Ni concentration in a central region of the five regions by 15% or more.

4. The multilayer ceramic capacitor according to claim 1, wherein
a number of the dielectric layers stacked is 200 or greater.

5. The multilayer ceramic capacitor according to claim 1, wherein
a plurality of dielectric layers are stacked across an internal electrode, and
80% or more of the plurality of dielectric layers are the dielectric layer.

* * * * *